Dec. 1, 1925.

J. H. LAKIN 1,564,075

WATER RECOOLER

Filed Jan. 30, 1925     3 Sheets-Sheet 1

J H. LAKIN.
INVENTOR

BY *Victor J. Evans*

ATTORNEY

Dec. 1, 1925.
J. H. LAKIN
1,564,075
WATER RECOOLER
Filed Jan. 30, 1925    3 Sheets-Sheet 3
Fig. 3.
Fig. 4.
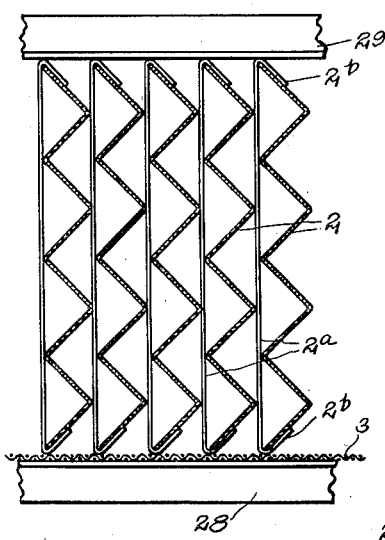
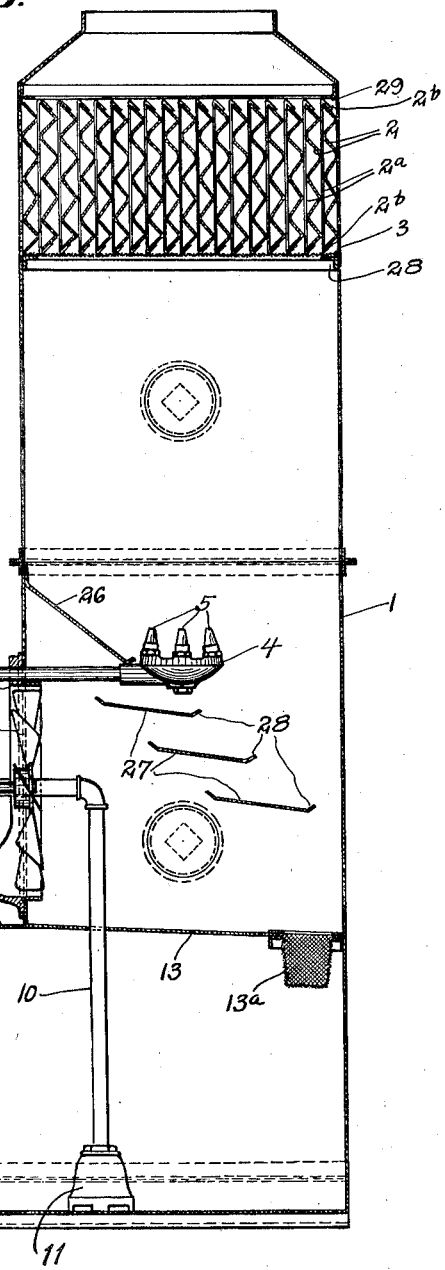
J. H. LAKIN.
INVENTOR
BY Victor J. Evans
ATTORNEY Patented Dec. 1, 1925.

1,564,075

UNITED STATES PATENT OFFICE.

J HARRY LAKIN, OF PITTSBURGH, PENNSYLVANIA, ASSIGNOR TO THE LAKIN MANUFACTURING COMPANY, OF PITTSBURGH, PENNSYLVANIA, A CORPORATION OF DELAWARE.

WATER RECOOLER.

Application filed January 30, 1925. Serial No. 5,817.

*To all whom it may concern:*

Be it known that I, J HARRY LAKIN, a citizen of the United States, residing at Pittsburgh, in the county of Allegheny and State of Pennsylvania, have invented new and useful Improvements in Water Recoolers, of which the following is a specification.

This invention relates to apparatus for recooling water, and more particularly to means whereby water used in connection with condensers of refrigerating plants, and for similar purposes, may be quickly and efficiently recooled so as to be again utilized for cooling purposes.

One of the main objects of the invention is to provide an apparatus of the character stated of simple and efficient construction and large capacity. Another object is to provide an apparatus which forms a unit and may be readily installed at comparatively small cost. Another object is to provide an apparatus in which the cooling effect will vary in accordance with variations in operation of the pump for feeding the water to the sprayers thus insuring proper recooling of the water. A further object is to provide an apparatus capable of use on refrigeration cars and other portable structures, the apparatus including a supporting base and reservoir of sufficient capacity to ensure an ample supply of water throughout a given distance traveled. Further objects will appear from the detail description.

In the drawings:—

Fig. 3 is a section taken on line 3—3 of Fig. 2;

Fig. 4 is a fragmentary section of the louver construction.

Figure 1:
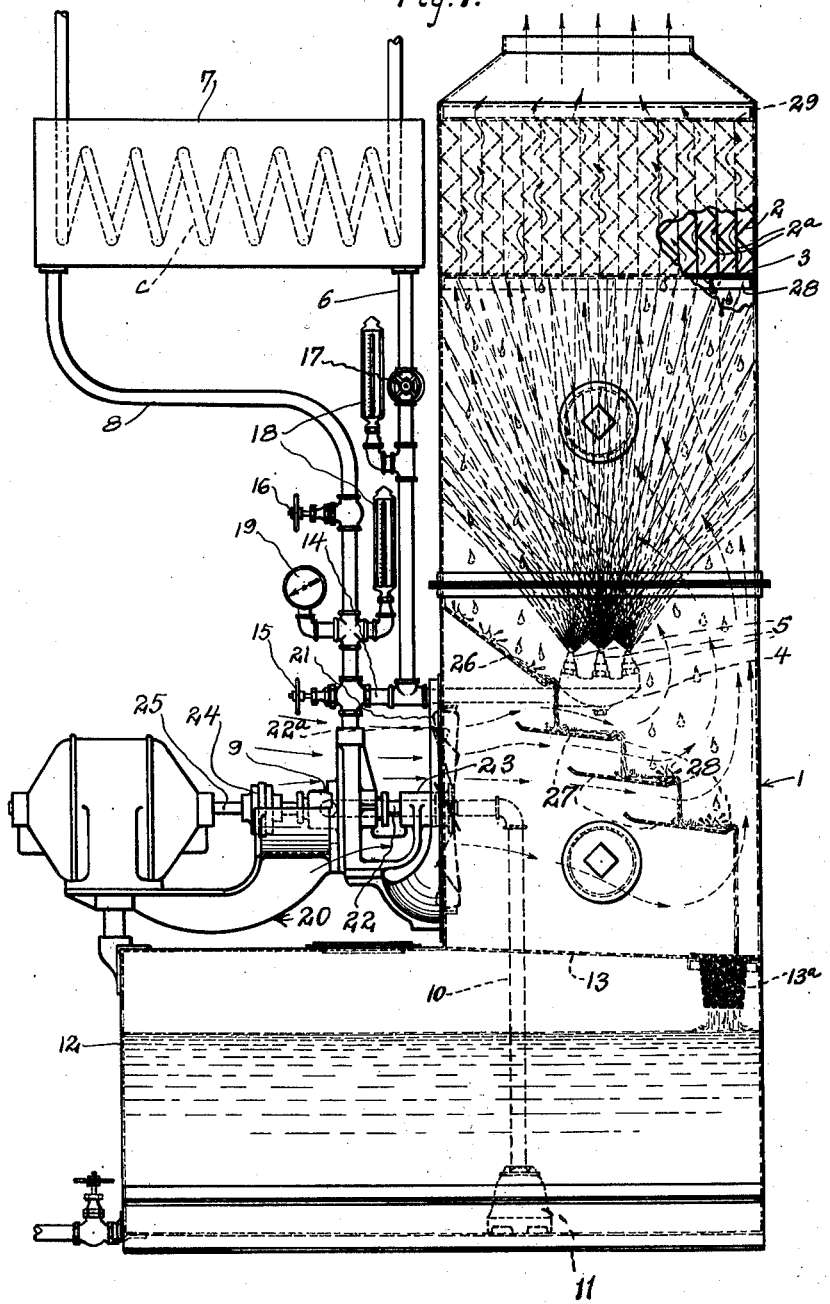
Fig. 1 is a side view, partly broken away, of an apparatus constructed in accordance with my invention.
Figure 2:
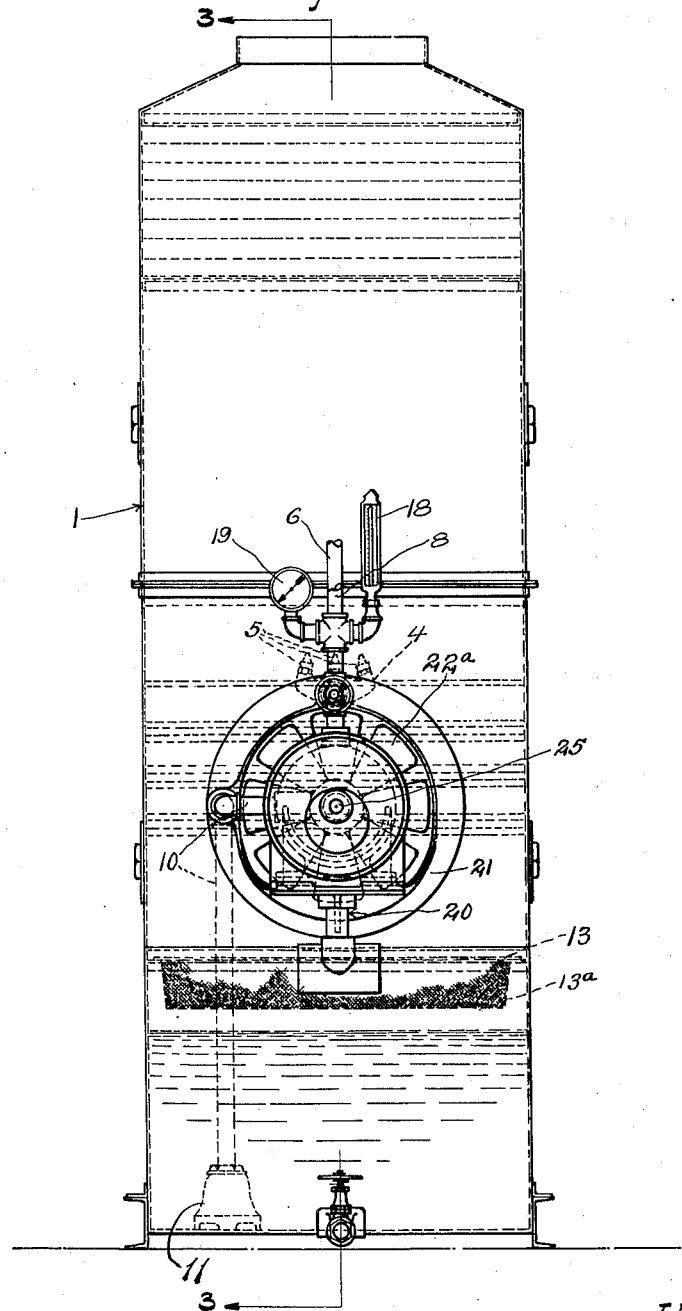
Fig. 2 is a front view of the apparatus.

I provide a sheet metal casing 1 of rectangular cross-section the top of which is open, this casing being provided adjacent its upper end with a plurality of spaced zigzag baffles 2 and with a screen 3 positioned immediately below these baffles. The baffles extend the full width of casing 1 and the screen extends throughout the interior cross-area of the casing. The baffles and the screen cooperate to permit free passage of air through the upper end of the casing while forming a louver preventing water to be cooled from escaping with the air.

A header 4 extends into casing 1 adjacent the bottom thereof. This header carries a plurality of spaced spray nozzles 5 by means of which water supplied to the header under pressure is sprayed upwardly within the casing in a plurality of substantially inverted cone-shaped sprays which unite to fill the upper portion of the casing with a fine mist or spray. Header 4 is connected to a return pipe 6 extending from a condenser 7 within which is positioned a cooling coil *c* of a refrigerating system, the cooling water being circulated about this coil in known manner for condensing the anhydrous ammonia contained therein in gaseous form. As will be understood, the condenser illustrated is of conventional type, and any suitable type may be employed. An inlet pipe 8 communicates with the condenser at the opposite end thereof to pipe 6. Pipe 8 leads from a centrifugal pump 9 which is connected by an intake pipe 10 to the interior of tank 1, this intake pipe being provided at its lower end with a suitable foot valve 11. The lower portion of casing 1 is enlarged to form a base 12 which projects forwardly of the casing and constitutes a reservoir of comparatively large capacity. This reservoir is separated from the body of the casing by a plate 13 which extends across the casing and is inclined downwardly toward the back wall thereof. Plate 13 is provided with an elongated opening adjacent the back wall of the casing and a screen 13ᵃ is suspended through the opening to prevent entry of foreign materials into the reservoir. Pipes 8 and 6 are connected by a cross pipe 14 below condenser 7, this cross pipe being provided with a valve 15 and pipes 8 and 6 being provided with valves 16 and 17, respectively. This provides simple and efficient means whereby water from the pump may be by-passed so as to cut out the condenser from the circuit when desired. Each of the pipes 6 and 8 is provided with a suitable thermometer 18, and a pressure gauge 19 of suitable type is connected to pipe 8.

A combined bearing bracket and fan housing 20 is mounted on the forwardly extending portion of base 12 of the casing and provides bearings and a support for the pump. The fan housing includes a ring 21 which fits into an opening provided for that purpose through the front wall of the casing. The pump shaft 22 is extended toward the casing and is rotatably mounted through a bearing sleeve 23 carried by the fan housing, and a blowing fan 22ª is secured on this shaft and is positioned within ring 21. The outer end of pump shaft 22 is secured by a suitable connection 24 to armature shaft 25 of an electric motor of suitable type mounted on bracket 20. This provides a common driving means for the pump and the fan so that the amount of air which is forced into the casing will vary in accordance with any variations in the speed of operation of the pump thus maintaining a fixed relation between the amount of water discharged from the spray head and the amount of air forced into the casing.

A deflector plate 26 extends across the casing above and in front of the spray head, and is inclined downwardly toward the spray head. This plate discharges onto the upper one of a series of plates 27 which extend across the casing below the spray head and are arranged in stepped and overlapping relation, these plates being inclined downwardly away from the fan. The plates 26 and 27 are provided with upwardly directed lateral flanges 28 which serve to strengthen and impart rigidity to the plates, the lower flanges also serving to retain or hold back the water which drips onto the plates so as to cause the water to be discharged into the lower portion of the casing in a cascade forming a plurality of thin sheets of water through which the air from the fan passes, thus assisting very materially in the cooling operation.

In operation the water is forced through pipe 8 into condenser 7 through which it flows so as to extract heat from condenser coil C. This warmer water then flows through pipe 6 and is discharged through the spray nozzles 5 in a fine spray which fills the upper portion of casing 1. During operation of pump 9, and therefore during circulation of the water, fan 22ª is rotated at relatively high speed so as to force air into the casing below the spray members, this air flowing between plates 26 and 27 and upwardly through the spray as indicated in Fig. 1. The upwardly flowing air current, which travels at greater velocity than the water sprays, serves to cool the minute water particles which, as they are cooled by the upwardly flowing air, condense and unite to form relatively large and heavy drops which fall onto plates 26 and 27 these drops being subjected during their descent to the cooling effect of the upwardly flowing air. In this manner the water is first sprayed so as to produce a very fine spray or mist through which the air is forced to produce an initial cooling effect and cause coalescing of the minute water particles which produce relatively heavy drops which descend through the air current so as to be cooled thereby, this water then flowing in a cascade over the plates 26 and 27 and being still further cooled by the current of air flowing between these plates. I thus obtain a maximum cooling effect for a given quantity of air and the temperature of the water is quickly lowered so as to render it available for use again for cooling the coil of the condenser. As the fan is connected directly to the pump and rotates in unison therewith, any variations in speed of operation of the pump will cause a corresponding variation in the speed of the fan, and accordingly in the volume of air which is forced through the water sprayed from nozzles 5. By this means I effect an automatic regulation of the cooling of the water and insure that it will be properly cooled at all times even when the speed of operation of the pump varies within comparatively wide limits.

Preferably, though not necessarily, I provide means for holding the baffles 2 of the louver construction in proper shape and spaced a short distance apart. This means includes a retaining strip 2ª at each end of each baffle 2, the end portions of this strip being bent to provide a hook element 2ᵇ which engages about the adjacent end portion of the baffles. As the baffle is of zigzag shape and possesses appreciable resiliency, being formed of sheet metal, so that it tends to expand vertically, the upper and lower corner portions of the baffle are held in engagement with the hook elements 2ᵇ of the strips 2ª thus ensuring that the baffles are effectually braced and spaced apart. The baffles are positioned between a lower angle strip 28 which is secured to the inner face of casing 1 and supports screen 3, and an upper angle strip 29 which is secured to the inner face of the casing. By this construction I avoid the necessity of securing the baffles 2 to the casing and these baffles can be readily removed when desired or necessary.

The apparatus constructed in the manner illustrated and described is particularly well adapted for use on refrigerator cars, in which capacity it has given very satisfactory results and has proven to be highly efficient. However, while this apparatus is intended primarily for use on refrigerator cars, it is also well suited for commercial and domestic use in which fields it has also proved to be of great practical value.

What I claim is:—

1. In a water cooling apparatus, a vertically disposed casing, means for spraying water upwardly within the upper portion of said casing, said casing being provided with an outlet opening at its upper end, a plurality of plates extending across the casing and arranged in stepped relation, and means for supplying air under pressure to the casing beneath said plates.

2. In a water cooling apparatus, a vertically disposed casing, means for spraying water upwardly within the upper portion of said casing, said casing being provided with an outlet opening at its upper end, a plurality of plates extending across the casing and arranged in stepped relation, and means for supplying air under pressure to the casing beneath said plates, the air supplying means being disposed to direct a current of air across and between said plates.

3. In a water cooling apparatus, a vertically disposed casing, means for spraying water upwardly within the upper portion of said casing, said casing being provided with an outlet opening at its upper end, a plurality of plates extending across the casing and arranged in stepped and overlapping relation, and means for supplying air under pressure to the casing beneath said plates.

4. In a water cooling apparatus, a vertically disposed casing, means for spraying water upwardly within the upper portion of said casing, said casing being provided with an outlet opening at its upper end, a plurality of plates extending across the casing and arranged in stepped and overlapping relation, and means for supplying air under pressure to the casing beneath said plates, said plates being inclined downwardly away from the air supplying means.

5. In a water cooling apparatus, a vertically disposed casing, means for spraying water upwardly within the upper portion of said casing, said casing being provided with an outlet opening at its upper end, a plurality of plates extending across the casing and arranged in stepped and overlapping relation, and means for supplying air under pressure to the casing beneath said plates, said plates being inclined downwardly away from the air supplying means and being provided at their lower edges with upwardly directed flanges.

6. In a water cooling apparatus, a vertically disposed casing having an outlet opening at its upper end, upwardly directed spray heads within the casing, a plurality of plates extending across the casing in stepped relation, the casing being provided with an opening disposed approximately in alignment with said plates and the plates being inclined downwardly of the casing away from the second mentioned opening, the base of said casing forming a reservoir, a blowing fan positioned in said second mentioned opening, a pump having its outlet connected to the spray heads and its intake communicating with said reservoir, and means for driving said pump and the fan.

In testimony whereof I affix my signature.

J HARRY LAKIN.